(12) United States Patent
Zhu

(10) Patent No.: US 9,049,104 B2
(45) Date of Patent: Jun. 2, 2015

(54) COORDINATION OF M2M DEVICE OPERATION BY M2M DEVICE MANAGERS IN A LAN

(75) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 505 days.

(21) Appl. No.: 13/186,196

(22) Filed: Jul. 19, 2011

(65) Prior Publication Data

US 2013/0024556 A1 Jan. 24, 2013

(51) Int. Cl.
| | |
|---|---|
| G06F 15/173 | (2006.01) |
| H04L 12/24 | (2006.01) |
| H04L 29/08 | (2006.01) |
| H04W 4/00 | (2009.01) |

(52) U.S. Cl.
CPC .......... *H04L 41/042* (2013.01); *H04L 41/0893* (2013.01); *Y04S 40/162* (2013.01); *H04L 67/125* (2013.01); *H04W 4/001* (2013.01); *H04W 4/005* (2013.01)

(58) Field of Classification Search
CPC ............................ H04W 4/005; H04L 41/0893
USPC ........ 709/223–226; 726/1–2, 26–29; 370/238
See application file for complete search history.

(56) References Cited

U.S. PATENT DOCUMENTS

| | | | |
|---|---|---|---|
| 6,324,577 B1 * | 11/2001 | Hirai ............................. | 709/223 |
| 6,778,882 B2 | 8/2004 | Spool et al. | |
| 7,135,956 B2 | 11/2006 | Bartone | |
| 7,171,374 B1 | 1/2007 | Sheehan et al. | |
| 7,333,880 B2 | 2/2008 | Brewster et al. | |

(Continued)

FOREIGN PATENT DOCUMENTS

| | | |
|---|---|---|
| WO | 0217151 A1 | 2/2002 |
| WO | 2008/043415 A1 | 4/2008 |

(Continued)

OTHER PUBLICATIONS

Niyato, Dusit et al.: Machine-to-machine Communications for Home Energy Management System in Smart Grid; IEEE Communications Magazine, IEEE Service Center, Piscataway, US; vol. 49, No. 4, Apr. 1, 2011, XP011372658, pp. 53-59.

(Continued)

*Primary Examiner* — Bharat N Barot
(74) *Attorney, Agent, or Firm* — Coats & Bennett, PLLC

(57) ABSTRACT

Teachings herein include a first machine-to-machine (M2M) device manager in a local area network (LAN). The first manager receives operating information for a first M2M device managed by the first manager. This operating information may indicate, for example, the operating state (e.g., on or off) of the first device. Responsive to receiving this operating information, the first manager coordinates operation of a second M2M device that is managed by a second M2M device manager in the LAN. The first manager effectively does so by evaluating the received operating information according to a set of policy-based rules, generating control signaling according to that evaluation, and then sending the generated control signaling to the second manager. Because this control signaling is sent horizontally between different M2M device managers, rather than vertically to some centralized server, such operation coordination can occur across M2M devices that would not otherwise be inter-operable.

24 Claims, 5 Drawing Sheets

(56) References Cited

U.S. PATENT DOCUMENTS

| | | |
|---|---|---|
| 7,715,951 B2 | 5/2010 | Forbes, Jr. et al. |
| 8,065,712 B1* | 11/2011 | Cheng et al. ................ 726/1 |
| 8,280,978 B2* | 10/2012 | Ansari et al. ............. 709/226 |
| 8,650,273 B2* | 2/2014 | Lambert et al. ........... 709/223 |
| 2002/0181501 A1* | 12/2002 | Nova et al. ................ 370/467 |
| 2003/0009401 A1 | 1/2003 | Ellis |
| 2003/0050737 A1 | 3/2003 | Osann, Jr. |
| 2003/0233201 A1 | 12/2003 | Horst et al. |
| 2008/0228908 A1* | 9/2008 | Link et al. ................. 709/223 |
| 2010/0131117 A1 | 5/2010 | Mattiocco et al. |
| 2011/0077758 A1 | 3/2011 | Tran et al. |
| 2011/0106328 A1 | 5/2011 | Zhou et al. |
| 2012/0188876 A1* | 7/2012 | Chow et al. ............... 370/237 |

FOREIGN PATENT DOCUMENTS

| | | |
|---|---|---|
| WO | 2009/030027 A1 | 3/2009 |
| WO | 2010091450 A1 | 8/2010 |
| WO | 2010098083 A1 | 9/2010 |

OTHER PUBLICATIONS

"Principles for a Telecommunications Management Network; M.3010 (Feb. 2000)"; ITU-T Standard in Force (I), International Telecommunication Union, Geneva, CH; Feb. 1, 2000, XP017402171, 42 pages.

International Search Report for PCT/IB2012/053670 with mailing date of Oct. 17, 2012; 5 pages.

* cited by examiner

COORDINATION OF M2M DEVICE OPERATION BY M2M DEVICE MANAGERS IN A LAN

TECHNICAL FIELD

The present invention generally relates to machine-to-machine (M2M) devices, and particularly relates to using M2M device managers in a local area network (LAN) to coordinate operation of different M2M devices.

BACKGROUND

Wireless communications are extending beyond traditional mobile voice and data devices. Unlike these traditional devices, machine-to-machine (M2M) devices, also known as Machine-Type Communication (MTC) devices, wirelessly communicate with little or no human intervention. For example, an M2M device may autonomously collect and send information to a supporting M2M server via a wireless communication network. This autonomous machine communication broadens the reach of useful wireless services to include smart utility consumption applications, like smart utility metering.

Known approaches to smart utility metering employ M2M devices that dynamically monitor and report utility consumption details to a centralized server at a utility company (e.g., an electric company, a gas company, a water company, or other provider of an important public utility). Some M2M devices can also receive communications from the centralized server, such as outage notifications, pricing information, or peak consumption shutoff commands. With all communications flowing in this way vertically between an M2M device and the centralized server, these known approaches are described herein as adopting a purely vertical communication structure.

The purely vertical communication structure remains relatively simple to implement. And the structure certainly provides a utility company and its customers with increased information and control, for making intelligent consumption decisions with regard to a particular utility. Yet the structure inherently requires employing M2M devices that are all inter-operable with the same centralized server, a requirement that is practically infeasible amongst multiple utility companies. As a result, the structure fails to offer a solution for comprehensive consumption information and control across different utilities, different utility companies, and/or different types of M2M devices.

SUMMARY

Teachings herein include a horizontal communication structure between M2M device managers in a local area network (LAN). Different M2M device managers in the LAN manage different M2M devices, or groups of such devices, e.g., using different communication protocols specific for inter-operability with those devices. The M2M device managers coordinate operation of the M2M devices by sending control signaling horizontally between the M2M device managers themselves, rather than vertically to some remote, centralized server. Through this horizontal control signaling, the teachings as applied to smart utility metering provide comprehensive information and control across different utilities, different utility companies, and/or different types of M2M devices.

More specifically, a first M2M device manager in a LAN includes a communications interface, a memory, and one or more processing circuits. The communications interface is configured to receive operating information for a first M2M device managed by the first M2M device manager. This operating information may indicate, for example, the operating state of the first M2M device, e.g., a device mode (on/off, high/low, heat/cool, etc.), the device's consumption rate (instantaneous, average, etc.), or the like. The memory is configured to store a set of policy-based rules. This rule set governs the response of the first M2M device manager to received operating information.

In this regard, responsive to the communications interface receiving operating information for the first M2M device, the one or more processing circuits are configured to coordinate operation of a second M2M device that is managed by a second M2M device manager in the LAN. The one or more processing circuits effectively do so by evaluating the received operating information according to the set of policy-based rules, generating control signaling according to that evaluation, and then sending the generated control signaling to the second M2M device manager.

In some embodiments, the control signaling comprises an actual command related to operation of the second M2M device. In other embodiments, the control signaling comprises a request for operating information for the second M2M device. In still other embodiments, the control signaling simply comprises an indication of operating information for the first M2M device. Regardless, that control signaling effectively coordinates operation of the second M2M device with operation of the first M2M device. Moreover, because that control signaling is sent horizontally between different M2M device managers, rather than vertically to some centralized server, such operation coordination can occur across M2M devices that would not otherwise be inter-operable.

The rule set described above may be specified in terms of individual M2M devices, groups of M2M devices, or any combination thereof. And, the first M2M device manager may belong to a hierarchy of M2M device managers, where different M2M device managers manage different groups of one or more M2M devices. Governed by such a rule set and belonging to such a hierarchy, the first M2M device manager may coordinate the operation of an individual M2M device based on operating information aggregated for a group of M2M devices. Alternatively, the manager may coordinate the collective operation of a group of M2M devices based on operating information for an individual M2M device. As yet another alternative, the manager may coordinate the collective operation of a group of M2M devices based on operating information aggregated for another group of M2M devices.

Embodiments that permit coordination of M2M device operation on an individual or group basis in this way prove advantageous in a wide variety of applications. Indeed, different groups of M2M devices may be managed by different M2M device managers. The different groups may include M2M devices of different types, M2M devices in different locations, M2M devices that use different communication protocols, or the like.

In some embodiments, this coordination remains limited to the local coverage area of a LAN. However, other embodiments extend the coordination across different LANs using a telecommunications network as the transport layer. In these embodiments, different hierarchies of M2M device managers in different LANs communicate with the telecommunications network via respective gateways. Notable embodiments herein conserve telecommunications network resources and provide each gateway with a unique telecommunications network identity that is common to those managers belonging to the same hierarchy. Regardless, by connecting different hierarchies of M2M device managers in different LANs, embodiments herein advantageously enable one M2M device manager in one LAN to coordinate operation of an M2M device that is managed by an M2M device manager in another LAN.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
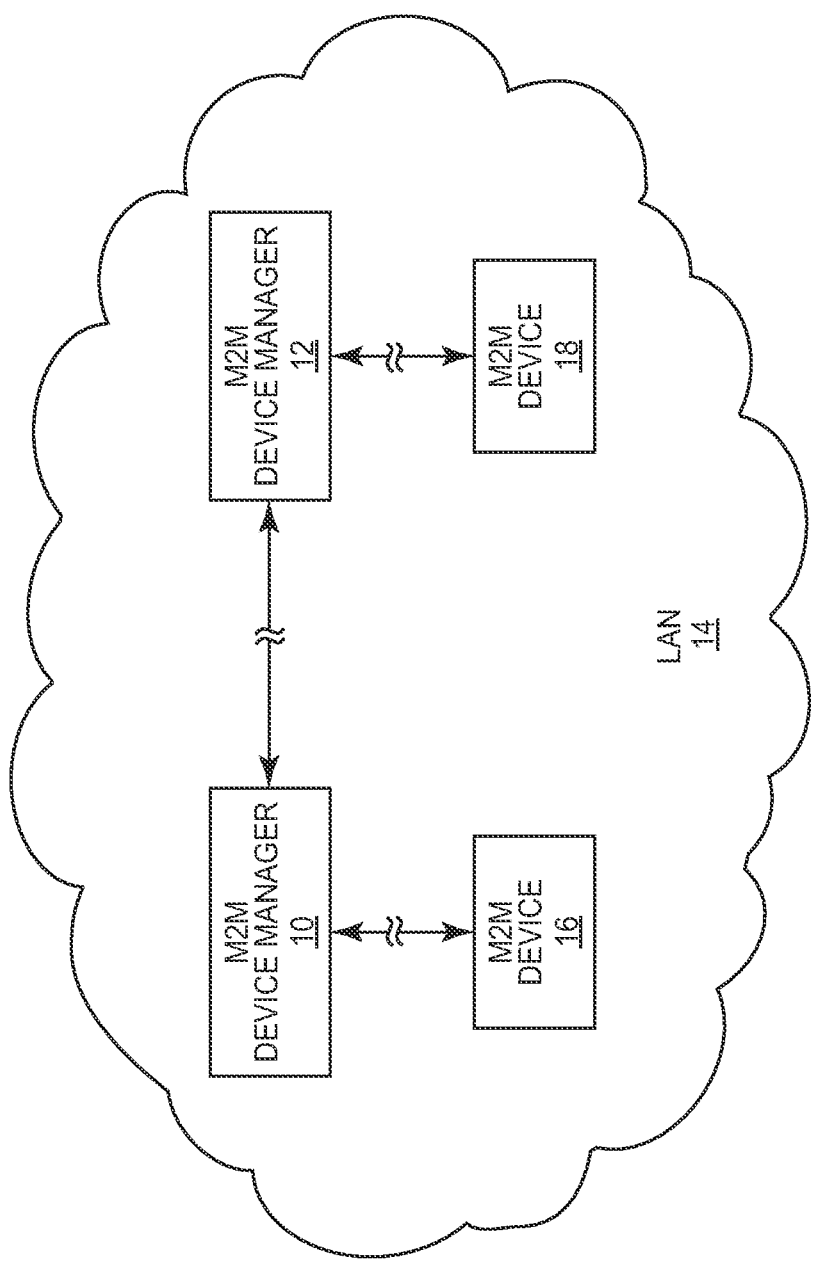
FIG. 1 is a block diagram of two M2M device managers in a LAN that manage respective M2M devices according to one or more embodiments.

FIG. 1 illustrates a first M2M device manager 10 and a second M2M device manager 12 in a local area network (LAN) 14. The first M2M device manager 10 manages a first M2M device 16 and the second M2M device manager 12 manages a second M2M device 18.

The first M2M device manager 10 is inter-operable with the first M2M device 16, but may not be inter-operable with the second M2M device 18. Likewise, the second M2M device manager 12 is inter-operable with the second M2M device 18, but may not be inter-operable with the first M2M device 16. Yet the M2M device managers 10, 12 coordinate operation of the M2M devices 16, 18 by sending control signaling horizontally between the M2M device managers 10, 12 themselves, rather than vertically to some centralized server.

Figure 2:
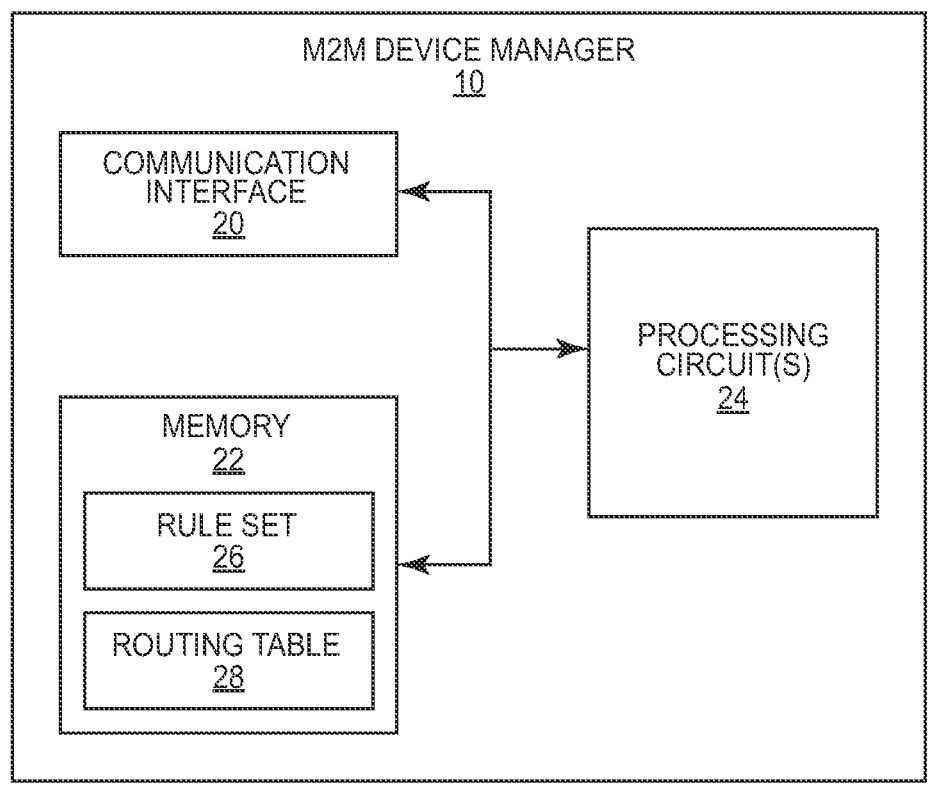
FIG. 2 is a block diagram of an M2M device manager according to some embodiments.

FIG. 2 illustrates additional details of an M2M device manager 10, 12 in this regard. With respect to the first M2M device manager 10 as a particular example, the manager 10 includes a communications interface 20, a memory 22, and one or more processing circuits 24.

The communications interface 20 is configured to receive operating information for the first M2M device 16. This operating information may indicate, for example, the operating state of the first M2M device 16. The first M2M device's operating state may include any one or more of: the device's mode (on/off, high/low, heat/cool, etc.), the device's consumption rate (instantaneous, average, etc.), and so on. In some embodiments, the operating information is received directly from the first M2M device 16, e.g., using a communication protocol specific to the first M2M device 16. In other embodiments, the operating information is received indirectly from the first M2M device 16, e.g., via an intermediate M2M device manager (not shown).

The memory 22 is configured to store a set 26 of policy-based rules. This rule set 26 governs the response of the first M2M device manager 10 to received operating information.

In this regard, responsive to the communications interface 20 receiving operating information for the first M2M device 16, the one or more processing circuits 24 are configured to coordinate operation of the second M2M device 18. The one or more processing circuits 24 effectively do so by evaluating the received operating information according to the set 26 of policy-based rules, generating control signaling according to that evaluation, and then sending the generated control signaling to the second M2M device manager 12.

In some embodiments, the control signaling comprises an actual command related to operation of the second M2M device 18. Such a command may, for instance, direct the second M2M device manager 12 to control operation of the second M2M device 18 in a particular manner. The particular manner in which the second M2M device 18 is to be controlled is specified by the rule set 26, as a function of the operating information received for the first M2M device 16.

For example, the rule set 26 may include one or more rules that generally direct the first M2M device manager 10 to change the device mode of the second M2M device 18 as a function of the device mode indicated by the operating information received for the first M2M device 16. Two such rules may logically comprise: IF (FIRST M2M DEVICE MODE="ON") GENERATE COMMAND AS (SECOND M2M DEVICE MODE="OFF"); ELSE IF (FIRST M2M DEVICE MODE="OFF") GENERATE COMMAND AS (SECOND M2M DEVICE MODE="ON"). Upon receiving a command generated based on these rules, the second M2M device manager 12 controls the second M2M device 18 accordingly.

Other embodiments coordinate operation of the second M2M device 18 also as a function of operating information for the second M2M device 18, rather than just operating information for the first M2M device 16. Some of these embodiments pull the operating information for the second M2M device 18 back to the first M2M device manager 10, so that the first M2M device manager 10 can evaluate the operating information for the two M2M devices 16, 18. Others of these embodiments push the operating information for the first M2M device 16 forward to the second M2M device manager 12, so that the second M2M device manager 12 can evaluate the operating information for the two M2M devices 16, 18.

In the context of pulling embodiments, the rule set 26 at the first M2M device manager 10 dictates that the control signaling sent responsive to receiving operating information for the first M2M device 16 comprise a request for operating information for the second M2M device 18 (rather than an actual command related to operation of the second M2M device 18). For example, the rule set 26 may include a rule that simply states: IF (FIRST M2M DEVICE MODE="ON") GENERATE REQUEST FOR SECOND M2M DEVICE OPERATING INFORMATION. This request directs the second M2M device manager 12 to respond with operating information for the second M2M device 18.

Responsive to receiving the operating information requested for the second M2M device 18, the one or more processing circuits 24 of the first M2M device manager 10 evaluate that information (and the previously received operating information for the first M2M device 16) according to the rule set 26. Based on that evaluation, the one or more processing circuits 24 generate additional control signaling, now in the form of an actual command related to operation of the second M2M device 18. This command, again, directs the second M2M device manager 12 to manage the second M2M device 18 in a particular manner, which is specified by the rule set 26 as a function of the operating information for the first and second M2M devices 16, 18. Finally, the one or more processing circuits 24 send the additional control signaling to the second M2M device manager 12.

Continuing the above example, the rule set 26 may include one or more rules that generally direct the first M2M device manager 10 to change the device mode of the second M2M device 18 as a function of both the device mode indicated by the operating information received for the first M2M device 16 and the consumption rate indicated by the operating information received for the second M2M device 18. One such rule may logically comprise: IF (FIRST M2M DEVICE MODE="ON") AND (SECOND M2M DEVICE CONSUMPTION RATE>X) GENERATE COMMAND AS (SECOND M2M DEVICE MODE="OFF"). This rule operates to only turn the second M2M device 18 "off" if the first M2M device 16 is "on" and the second M2M device is consuming a utility at a rate greater than a defined threshold "X". Upon receiving a command generated based on this rule, the second M2M device manager 12 controls the second M2M device 18 accordingly.

In the context of pushing embodiments, the rule set 26 at the first M2M device manager 10 dictates that the control signaling simply indicates the operating information for the first M2M device 16 to the second M2M device manager 12. For example, the rule set 26 may include a rule that simply states: IF (FIRST M2M DEVICE MODE="ON") GENERATE NOTIFICATION AS (FIRST M2M DEVICE MODE="ON"). According to this rule, the first M2M device manager 10 simply generates a notification that indicates the first M2M device mode to the second M2M device manager 12.

The second M2M device manager 12 then processes that information according to its own set of policy-based rules. The second manager's rule set may, for instance, dictate that the second M2M device manager 12 requests operating information from the second M2M device 18 responsive to receiving operating information for the first M2M device 16. The second M2M device manager 12 may then evaluate the operating information for the first and second M2M devices 16, 18 according to its rule set, generate a control command for the second M2M device 18 according to that evaluation, and send the control command to the second M2M device 18.

Although the pulling and pushing embodiments have been described above from the perspective of the first M2M device manager 10, such embodiments may be equally applied from the perspective of the second M2M device manager 12. That is, the second M2M device manager 12 may pull operating information for the first M2M device 16, so that the second M2M device manager 12 can evaluate the operating information for the two M2M devices 16, 18. Likewise, the second M2M device manager 12 may push operating information for the second M2M device 18 forward to the first M2M device manager 10, so that the first M2M device manager 10 can evaluate the operating information for the two M2M devices 16, 18.

Thus, whether the control signaling sent from the first M2M device manager 10 to the second M2M device manager 12 comprises an actual command related to operation of the second M2M device 18, a request for operating information for the second M2M device 18, or simply an indication of operating information for the first M2M device 16, that control signaling effectively coordinates operation of the second M2M device 18 with operation of the first M2M device 16. Moreover, because that control signaling is sent horizontally between different M2M device managers 10, 12, rather than vertically to some centralized server, such operation coordination can occur across M2M devices that would not otherwise be inter-operable.

In some embodiments, for example, the first and second M2M devices 16, 18 use different communication protocols. This may be due to the M2M devices 16, 18 being made by different manufacturers, operating according to different standards, or the like. Regardless, the first M2M device manager 10 is configured to interpret or otherwise recognize the communication protocol used specifically by the first M2M device 16, and the second M2M device manager 12 is configured to interpret or otherwise recognize the communication protocol used specifically by the second M2M device 18. The M2M device managers 10, 12 then communicate using a different communication protocol, one that is commonly understood by both managers 10, 12.

Consider for example an embodiment where the first M2M device manager 10 receives the operating information for the first M2M device 16 directly from that device 16. In that case, the manager 10 receives the operating information using a first communication protocol, but sends control signaling to the second M2M device manager 12 using a second communication protocol that is different from the first communication protocol. Moreover, both the first and second communication protocols may be different from a third communication protocol used by the second M2M device 18.

The ability of the M2M device managers 10, 12 to coordinate M2M device operation in this way proves particularly useful for smart utility consumption applications. As one practical example, presume the M2M device managers 10, 12 operate in a LAN 14 in a person's home and coordinate the consumption of one or more utilities by the M2M devices 16, 18 in that home. The first M2M device 16 may be, for instance, a smart heating system that consumes gas at the direction of the first M2M device manager 10. The first M2M device 16 occasionally or periodically reports operating information to the first M2M device manager 10 in terms of its operating state (e.g., its device mode, its gas consumption rate, etc.). By contrast, the second M2M device 18 may be a smart refrigerator that consumes electricity at the direction of the second M2M device manager 12. The second M2M device 18 occasionally or periodically reports operating information to the second M2M device manager 12 in terms of its operating state (e.g., its device mode, its electricity consumption rate, etc.).

Responsive to receiving operating information indicating the operating state of the first M2M device 16, the first M2M device manager 10 coordinates the operating state of the second M2M device 18 in accordance with the manager's rule set 26. The rule set 26 may generally dictate, for instance, that the second M2M device 18 (the electric refrigerator) is to turn on when the first M2M device 16 (the gas heating system) turns off. Of course, the particular way in which the first M2M device manager 10 accomplishes such coordination (in terms of the specific control signaling it sends to the second M2M device manager 12) may vary as discussed above. Analogous coordination may be offered by the second M2M device manager 12, with that manager's rule set generally dictating that the first M2M device 16 is to turn on when the second M2M device 18 turns off. Coordinating device operation in this way promotes efficient consumption of different utilities provided by different utility companies, an advantage heretofore infeasible due to the lack of inter-operability between such companies, their respective centralized servers, and their respective M2M devices.

Note that while in the example above both devices were smart devices capable of being controlled, such need not be the case. The first M2M device 16, for example, may simply comprise a smart meter that passively measures or otherwise obtains operating information for a relatively "dumb" device and relays that information to the first M2M device manager 10. The manager 10 may then coordinate operation of the second M2M device 18 in reaction to operation of the first M2M device 16.

Note also that while the example related to smart utility consumption applications, embodiments herein are not limited to those applications. Indeed, the embodiments herein may extend to any application benefiting from operation coordination amongst M2M devices. For instance, certain embodiments may prove useful in the context of monitoring services. In this case, the first M2M device 16 may comprise an autonomous vacuum cleaner that occasionally or periodically cleans a person's home. The second M2M device 18 by contrast may comprise a monitoring system that monitors that person's home for intruders.

Each M2M device 16, 18 reports operating information to its respective M2M device manager 10, 12 in terms of its operating state. Responsive to receiving operating information indicating the operating state of the first M2M device 16, the first M2M device manager 10 coordinates the operating state of the second M2M device 18 in accordance with the manager's rule set 26. The rule set 26 may generally dictate, for instance, that the second M2M device 18 (the monitoring system) is to temporarily turn off while the first M2M device 16 (the vacuum cleaner) is turned on. In this way the rule set 26 prevents the monitoring system from falsely detecting that the autonomous vacuum cleaner is an intruder.

The rule set 26 may of course dictate other responses to received operating information. Indeed, the rule set 26 in at least some embodiments may be dynamically initialized or modified to coordinate M2M device operation as desired. In one embodiment, for example, the communications interface 20 of the first M2M device manager 10 is configured to receive one or more rule definitions. The one or more processing circuits 24 are then configured to dynamically initialize or modify the set 26 of policy-based rules according to the received rule definitions.

One or more of the rule definitions may be specified by an end user associated with the M2M devices 16, 18 whose operation is to be coordinated. In some embodiments, the end user specifies one or more rule definitions using a web interface to the M2M device managers 10, 12, whereupon the specified rule definitions are transmitted to appropriate managers 10, 12 via a packet data network (e.g., the Internet) and the LAN 14. In other embodiments, the end user specifies one or more rule definitions using a local connection to the M2M device managers 10, 12, such as a Bluetooth connection.

Alternatively or additionally, rule definitions may be specified by a party other than the end user, such as a remotely located service provider. As applied to smart utility metering contexts, for instance, rule definitions may be specified by the operator of a utility company. Such rule definitions may mandate rules required for M2M device coordination, or simply recommend default rules for M2M device coordination.

In this regard, note that the rule set 26 may be specified in terms of individual M2M devices, groups of M2M devices, or any combination thereof. Governed by such a rule set 26, the first M2M device manager 10 may coordinate the operation of an individual M2M device based on operating information aggregated for a group of M2M devices. Alternatively, the manager 10 may coordinate the collective operation of a group of M2M devices based on operating information for an individual M2M device. As yet another alternative, the manager 10 may coordinate the collective operation of a group of M2M devices based on operating information aggregated for another group of M2M devices.

Figure 3:
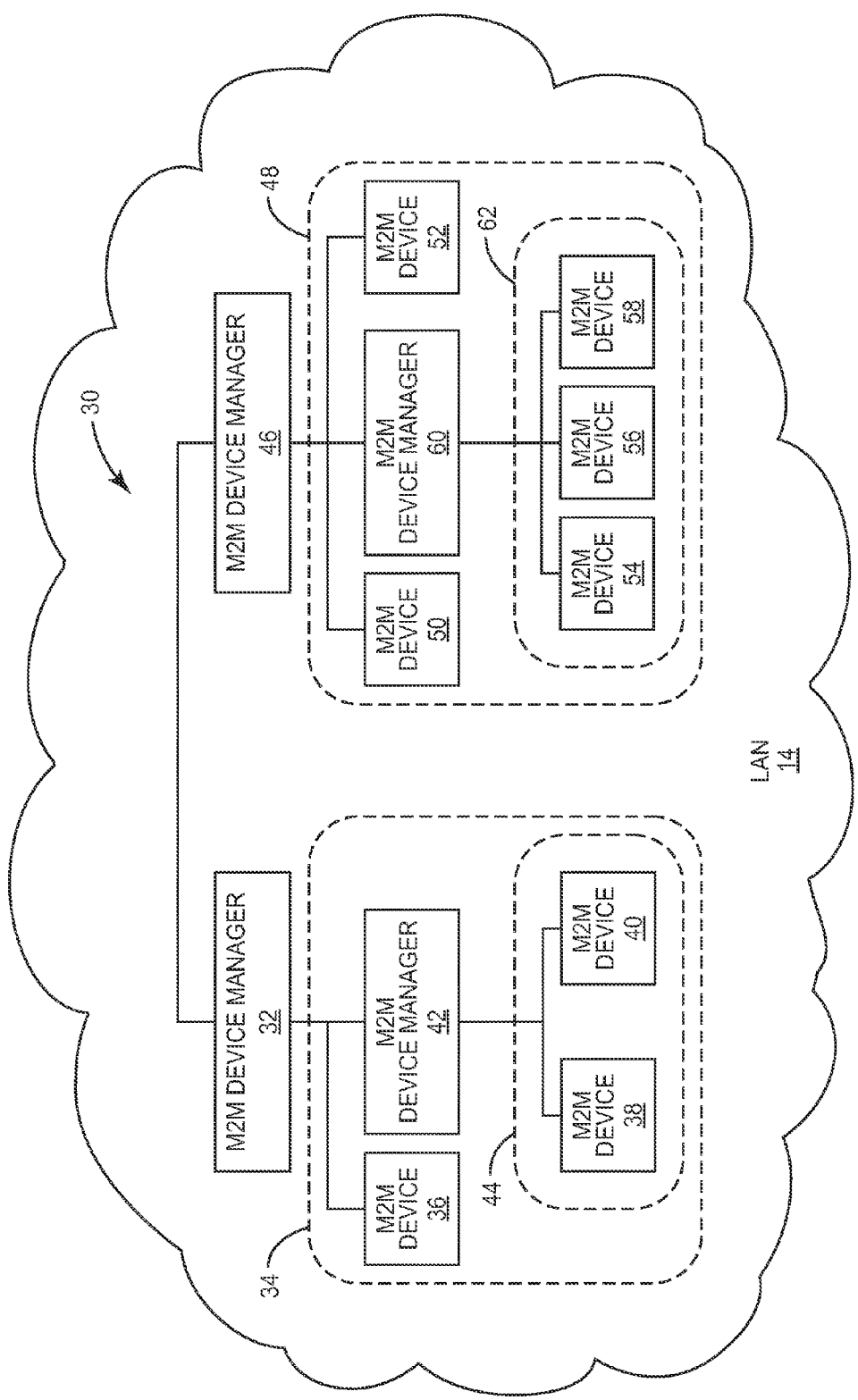
FIG. 3 is a block diagram of M2M device managers that belong to a hierarchy of M2M device managers according to one or more embodiments.

FIG. 3 illustrates additional details regarding such embodiments. As shown in FIG. 3, M2M device managers in the LAN 14 belong to a hierarchy 30 of M2M device managers. Different M2M device managers in the hierarchy 30 manage different groups of one or more M2M devices, according to respective rule sets defined for each manager.

For example, M2M device manager (DM) 32 manages a group 34 of M2M devices that includes M2M device 36, M2M device 38, and M2M device 40. M2M device manager 42 more specifically manages a group 44 of M2M devices that only includes M2M devices 38 and 40, not M2M device 36. Much the same can be said of the remaining M2M device managers and M2M devices in the hierarchy 30. M2M device manager 46 manages a group 48 that includes M2M devices 50, 52, 54, 56, and 58, while M2M device manager 60 manages a group 62 that only includes M2M devices 54, 56, and 58.

Consider M2M device manager 32. This manager 32 receives operating information for M2M device 36 directly from that device 36, but receives operating information for M2M devices 38 and 40 indirectly through intermediate M2M device manager 42. In at least some embodiments, the operating information received for devices 38 and 40 comprises information that has been aggregated for group 44 as a whole by the intermediate M2M device manager 42. For example, the intermediate M2M device manager 42 may have accumulated, analyzed, or otherwise processed the operating information it received from those devices 38 and 40 directly, and conveyed the operating information for devices 38 and 40 as the processing result. Where the operating information comprises utility consumption measurements, for instance, the operating information received from M2M device manager 42 may represent aggregated utility consumption measurements of group 44. In this regard, M2M device manager 32 may further aggregate the operating information it received for devices 38 and 40 with the operating information it received for device 36, to obtain information aggregated for group 34.

M2M device manager 32 may then coordinate the operation of one or more other M2M devices, as governed by its rule set, based on operating information received for individual M2M device 36, based on operating information received for group 44, or based on operating information obtained for group 34. For example, M2M device manager 32 may coordinate the individual operation of M2M device 56, or coordinate the collective operation of group 62.

Embodiments that permit coordination of M2M device operation on an individual or group basis in this way prove advantageous in a wide variety of applications. Indeed, different groups of M2M devices may include M2M devices of different types, M2M devices in different locations, M2M devices that use different communication protocols, or the like. Thus, in one application, the collective operation of gas-consuming M2M devices may be coordinated based on operation of electricity-consuming M2M devices, and vice versa. In another application, the collective operation of M2M devices located on one floor of a building may be coordinated based on operation of M2M devices located on another floor of a building.

Figure 4:
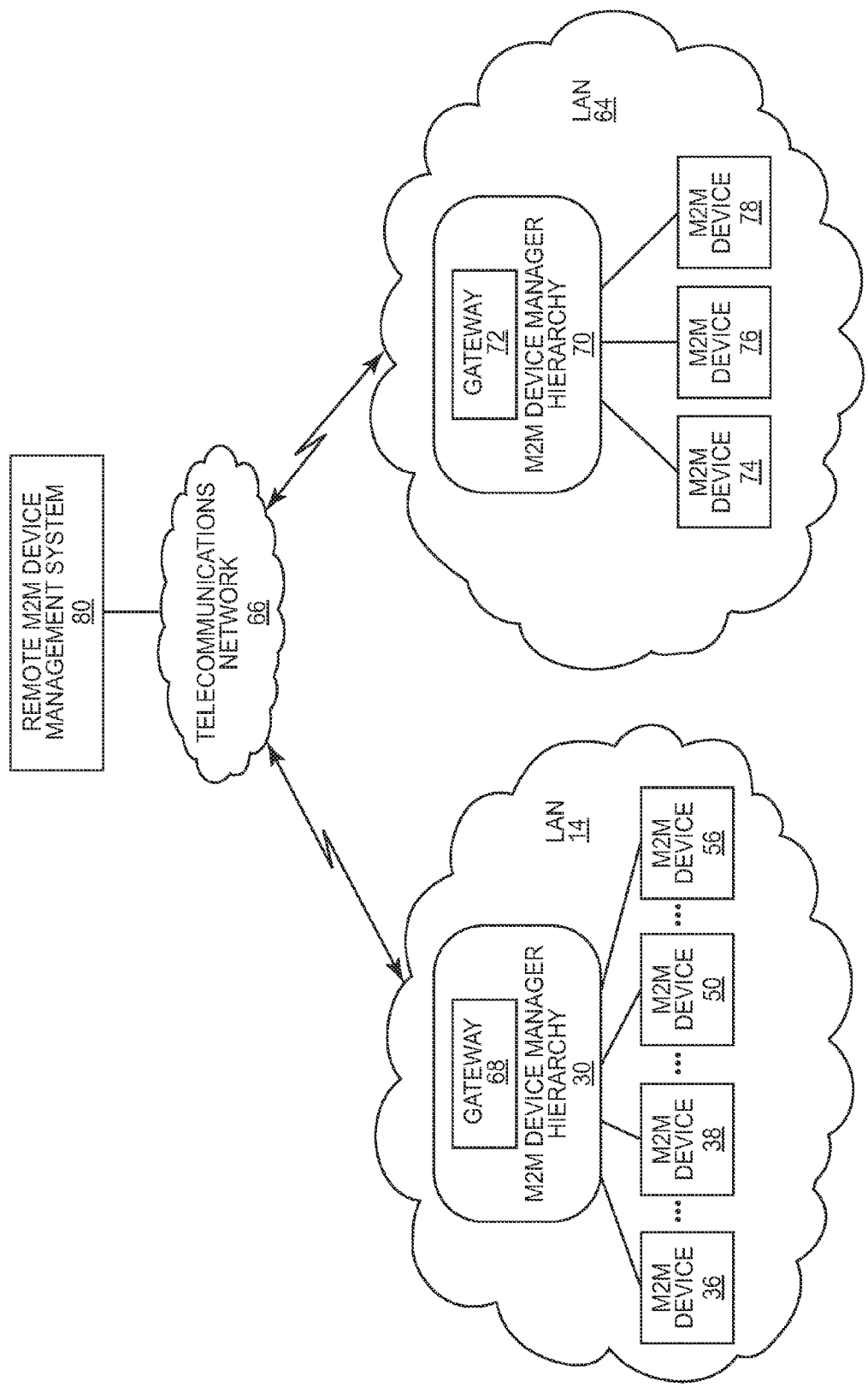
FIG. 4 is a block diagram of a distributed M2M device management system whereby according to one or more embodiments an M2M device manager connects to a remote server, or to an M2M device manager in another LAN, via a gateway to a telecommunications network.

In some embodiments, this coordination remains limited to the local coverage area of LAN 14. However, other embodiments extend the coordination across different LANs using a telecommunications network as the transport layer. FIG. 4 illustrates an example of these latter embodiments.

In FIG. 4, M2M device coordination is extended across LAN 14 and LAN 64 using a telecommunications network 66. To this end, the hierarchy 30 of M2M device managers in LAN 14 communicates with the telecommunications network 66 via gateway 68. The gateway 68 may, for instance, include a telecommunications network interface for wirelessly communicating with the telecommunications network 66 over radio resources. Likewise, a different hierarchy 70 of M2M device managers in LAN 64 communicates with the telecommunications network 66 via another gateway 72.

Of course, if the hierarchies 30 and 72 include any appreciable number of M2M device managers, providing a unique telecommunications network identity (e.g., an MSISDN) to each manager would significantly tax the telecommunications network 66. Notable embodiments herein therefore provide each gateway 68, 72 with a unique telecommunications network identity that is common to those managers belonging to the same hierarchy. That is, gateway 68 is identified in the telecommunications network 66 by a first identity that is common to all M2M device managers in hierarchy 30, while gateway 72 is identified in the telecommunications network 66 by a second identity that is common to all M2M device managers in hierarchy 70.

To prevent a gateway from becoming a single point of connection failure to the telecommunications network, a hierarchy may employ multiple, redundant gateways. If the gateway currently connecting the hierarchy to the telecommunications network with a particular identity fails, a redundant gateway assumes the role of that failed gateway and adopts that same identity in order to recover the connection. In some embodiments, redundant gateways actively detect failure of the current gateway and initiate connection recovery with the M2M device managers. In other embodiments, M2M device managers detect failure of the current gateway and initiate connection recovery with a redundant gateway.

Regardless, by connecting different hierarchies of M2M device managers in different LANs, embodiments herein advantageously enable one M2M device manager in one LAN to coordinate operation of an M2M device that is managed by an M2M device manager in another LAN. Consider, for example, a first M2M device manager in LAN 14 that belongs to hierarchy 30 and that manages M2M device 36. This first M2M device manager may coordinate operation of M2M device 74, even though this device 74 is managed by a second M2M device manager in LAN 64 that belongs to hierarchy 70. To do so, the first M2M device manager receives operating information for M2M device 36, evaluates that operating information according to its rule set, and generates control signaling according to that evaluation. The first M2M device manager in LAN 14 then sends the control signaling to the second M2M device manager in LAN 64 via gateway 68, the telecommunications network 66, and gateway 72.

Cross-LAN embodiments such as these again prove advantageous for smart utility consumption applications. As one practical example, presume the M2M device manager hierarchies 30, 70 operate in different homes and coordinate the consumption of one or more utilities by the M2M devices in those homes. According to the rule sets defined in respective M2M device managers, if one home generates a particular utility and therefore has more of that utility than required by its associated M2M devices, M2M device managers in that home coordinate with the M2M device managers in the other home to provide the excess utility to M2M devices in that home. The rule sets may of course specify a negotiated rate or price for providing the excess utility between homes, and may be modified by respective users as desired. This example may also be expanded in scale from a neighborhood, to a community, and so on.

Note that sending control signaling horizontally between M2M device managers in this way does not preclude also sending control signaling vertically to a remote server. In some embodiments, for example, the telecommunications network 66 also connects M2M device managers to a remote M2M device management server 80. So connected, an M2M device manager in LAN 14 may also report operating information for M2M device 36 to the remote server 80 via gateway 68. In at least one embodiment where the remote server comprises or is associated with a web server, such reporting facilitates the creation or update of a web interface for such operating information. This remote server 80 may additionally or alternatively be located within the telecommunications network 66 itself, and may be configured to coordinate the assignment of identifies to different gateways.

Also note that while a gateway has been described above as being separate from its respective M2M device manager hierarchy, a gateway may also serve as an M2M device manager in that hierarchy (e.g., as a root M2M device manager). The gateway may therefore have its own policy-based rules, e.g., defined in terms of operating information aggregated for all M2M devices managed by the hierarchy.

Moreover, for clarity reasons, the above description has omitted certain details regarding routing of the control signaling between M2M device managers. Despite this omission, in at least some embodiments, each M2M device manager may send control signaling to another M2M device manager according to a defined routing table 28 in memory (see FIG. 2). The routing table 28 defined for an M2M device manager may be dynamically populated by an M2M device manager discovery process in the LAN. Regardless, the routing table entries include routable addresses for different M2M device managers in the LAN.

Further note that M2M device managers herein may comprise either physical or logical nodes in a LAN. That is, different M2M device managers may be implemented in the same or different physical nodes. If implemented in the same physical node, however, corresponding client and server relationships still exist between different M2M device managers according to their respective level in the hierarchy.

Thus, those skilled in the art will appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
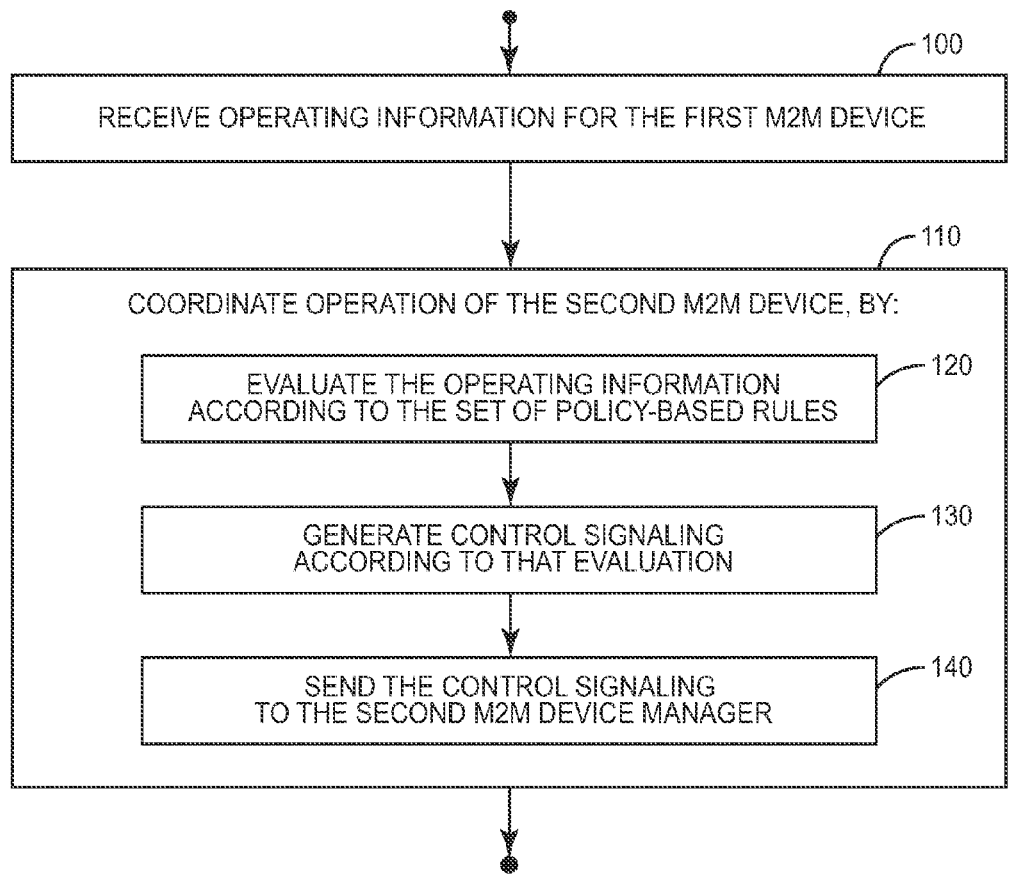
FIG. 5 is a logic flow diagram of a method implemented by an M2M device manager according to one or more embodiments.

In view of the modifications and variations described above, those skilled in the art will generally appreciate that a first M2M device manager 10 in a LAN 14 generally performs the processing shown in FIG. 5. As shown in FIG. 5, processing includes receiving operating information for a first M2M device 16 managed by the first M2M device manager 10 (Block 100). Processing further includes coordinating operating of a second M2M device 18 managed by a second M2M device manager 12 in the LAN 14 (Block 110). Such coordinating comprises evaluating the operating information according to a set 26 of policy-based rules (Block 120) and generating control signaling according to that evaluation (Block 130). Finally, the coordination comprises sending the control signaling to the second M2M device manager 12.

Those skilled in the art will of course recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a first machine-to-machine (M2M) device manager in a local area network (LAN), the first M2M device manager comprising one or more processing circuits, wherein the method comprises:
   receiving, at the first M2M device manager, operating information for a first M2M device that is in the LAN and that is managed by the first M2M device manager; and
   at the first M2M device manager, coordinating operation of a second M2M device that is in the LAN and that is managed by a second M2M device manager in the LAN, by:
   evaluating at least said operating information for the first M2M device according to a set of policy-based rules;
   generating control signaling according to that evaluation, wherein the control signaling is either: said operating information for the first M2M device to assist the second M2M device manager in managing the second M2M device; or a command related to operation of the second M2M device; and
   sending said control signaling from the first M2M device manager to the second M2M device manager.

2. The method of claim 1, wherein said control signaling indicates said operating information for the first M2M device to the second M2M device manager.

3. The method of claim 1, wherein said control signaling directs the second M2M device manager to respond with operating information for the second M2M device, wherein said receiving further comprises receiving operating information for the second M2M device from the second M2M device manager responsive to said control signaling, and wherein said coordinating further comprises:
   evaluating said operating information for the first and second M2M devices according to the set of policy-based rules;
   generating, based on that evaluation, additional control signaling which directs the second M2M device manager to manage the second M2M device in accordance with the set of policy-based rules; and
   sending that additional control signaling to the second M2M device manager.

4. The method of claim 1, further comprising receiving one or more rule definitions and dynamically initializing or modifying the set of policy-based rules according to those one or more rule definitions.

5. The method of claim 1, wherein the operating information indicates an operating state of the first M2M device, and wherein said coordinating comprises coordinating an operating state of the second M2M device.

6. The method of claim 1, wherein the first and second M2M device managers belong to a first hierarchy of M2M device managers, wherein different M2M device managers in the first hierarchy manage different groups of one or more M2M devices.

7. The method of claim 6, wherein the different groups either include M2M devices of different types, M2M devices of different types, M2M devices in different locations, or M2M devices that use different communication protocols.

8. The method of claim 6, wherein at least one of:
   the operating information comprises operating information aggregated for a group of M2M devices managed by the first M2M device manager, including the first M2M device; and
   said coordinating comprises coordinating the collective operation of a group of M2M devices managed by the second M2M device manager, including the second M2M device.

9. The method of claim 6, further comprising reporting the operating information for the first M2M device to a central M2M device management system via a gateway to a telecommunications network, the gateway being identified in the telecommunications network by an identity that is common to all M2M device managers in the first hierarchy.

10. The method of claim 6, further comprising coordinating operation of a third M2M device managed by a third M2M device manager that is in another LAN and that belongs to a second hierarchy of M2M device managers, by evaluating said operating information according to a set of policy based rules, generating control signaling according to that evaluation, and sending said control signaling by the third M2M device manager via first and second gateways to a telecommunications network, wherein the first gateway is identified in the telecommunications network by a first identity that is common to all M2M device managers in the first hierarchy and the second gateway is identified in the telecommunications network by a second identity that is common to all M2M device managers in the second hierarchy.

11. The method of claim 1, wherein coordinating operation of the second M2M device includes controlling the consumption of a utility by the second M2M device.

12. The method of claim 1, wherein the first M2M device and the first M2M device manager reside in a first home, wherein the first M2M device generates an excess of a utility, and wherein the method further comprises coordinating operation of a third M2M device managed by a third M2M device manager in another LAN, wherein the third M2M device and the third M2M device manager reside in a second home, and wherein coordinating operation of the third M2M device comprises providing the excess of said utility to the third M2M device in the second home.

13. A first machine-to-machine (M2M) device manager in a local area network (LAN), comprising:
   a communications interface configured to receive operating information for a first M2M device that is in the LAN and that is managed by the first M2M device manager;
   a memory configured to store a set of policy-based rules; and
   one or more processing circuits configured to coordinate operation of a second M2M device that is in the LAN and that is managed by a second M2M device manager in the LAN, by:
   evaluating at least said operating information for the first M2M device according to the set of policy-based rules;
   generating control signaling according to that evaluation, wherein the control signaling is either: said operating information for the first M2M device to assist the second M2M device manager in managing the second M2M device; or a command related to operation of the second M2M device; and
   sending said control signaling to the second M2M device manager.

14. The first M2M device manager of claim 13, wherein said control signaling indicates said operating information for the first M2M device to the second M2M device manager.

15. The first M2M device manager of claim 13, wherein said control signaling directs the second M2M device manager to respond with operating information for the second M2M device, wherein said communications interface is further configured to receive operating information for the second M2M device from the second M2M device manager responsive to said control signaling, and wherein said one or more processing circuits are further configured to:
   evaluate said operating information for the first and second M2M devices according to the set of policy-based rules;
   generate, based on that evaluation, additional control signaling which directs the second M2M device manager to manage the second M2M device in accordance with the set of policy-based rules; and
   send that additional control signaling to the second M2M device manager.

16. The first M2M device manager of claim 13, wherein the communications interface is further configured to receive one or more rule definitions and wherein the one or more processing circuits are configured to dynamically initialize or modify the set of policy-based rules according to those one or more rule definitions.

17. The first M2M device manager of claim 13, wherein the operating information indicates an operating state of the first M2M device, and wherein said one or more processing circuits are configured to coordinate an operating state of the second M2M device.

18. The first M2M device manager of claim 13, wherein the first and second M2M device managers belong to a first hierarchy of M2M device managers, wherein different M2M device managers in the first hierarchy marage different groups of one or more M2M devices.

19. The first M2M device manager of claim 18, wherein the different groups either include M2M devices of different types, M2M devices in different locations or M2M devices that use different communication protocols.

20. The first M2M device manager of claim 18, wherein at least one of:
   the operating information comprises operating information aggregated for a group of M2M devices managed by the first M2M device manager, including the first M2M device; and
   said one or more processing circuits are configured to coordinate the collective operation of a group of M2M devices managed by the second M2M device manager, including the second M2M device.

21. The first M2M device manager of claim 18, wherein said one or more processing circuits are further configured to report the operating information for the first M2M device to a central M2M device management system via a gateway to a telecommunications network, the gateway being identified in the telecommunications network by an identity that is common to all M2M device managers in the first hierarchy.

22. The first M2M device manager of claim 18, wherein said one or more processing circuits are further configured to coordinate operation of a third M2M device managed by a third M2M device manager that is in another LAN and that belongs to a second hierarchy of M2M device managers, by evaluating said operating information according to a set of policy-based rules, generating control signaling according to that evaluation, and sending said control signaling to the third M2M device manager via first and second gateways to a telecommunications network, wherein the first gateway is identified in the telecommunications nework by a first identity that is common to all M2M device managers in the first hierarchy and the second gateway is identified in the telecommunications network by a second identity that is common to all M2M device managers in the second hierarchy.

23. The first M2M device manager of claim 13, wherein said one or more processing circuits are configured to coordinate operation of the second M2M device by controlling the consumption of a utility by the second M2M device.

24. The first M2M device manager of claim 13, wherein the first M2M device and the first M2M device manager reside in a first home, wherein the first M2M device generates an excess of a utility, and wherein said one or more processing circuits are further configured to coordinate operation of a third M2M device managed by a third M2M device manager in another LAN, wherein the third M2M device and the third M2M device manager reside in a second home, and wherein the one or more processing circuits are configured to coordinate operation of the third M2M device by providing the excess of said utility to the third M2M device in the second home.

\* \* \* \* \*